Mar. 20, 1923.
M. POETZSCH.
COMBINED NAPPER AND SHEARING MACHINE.
FILED JUNE 25, 1921.
1,449,293.
2 SHEETS—SHEET 2.
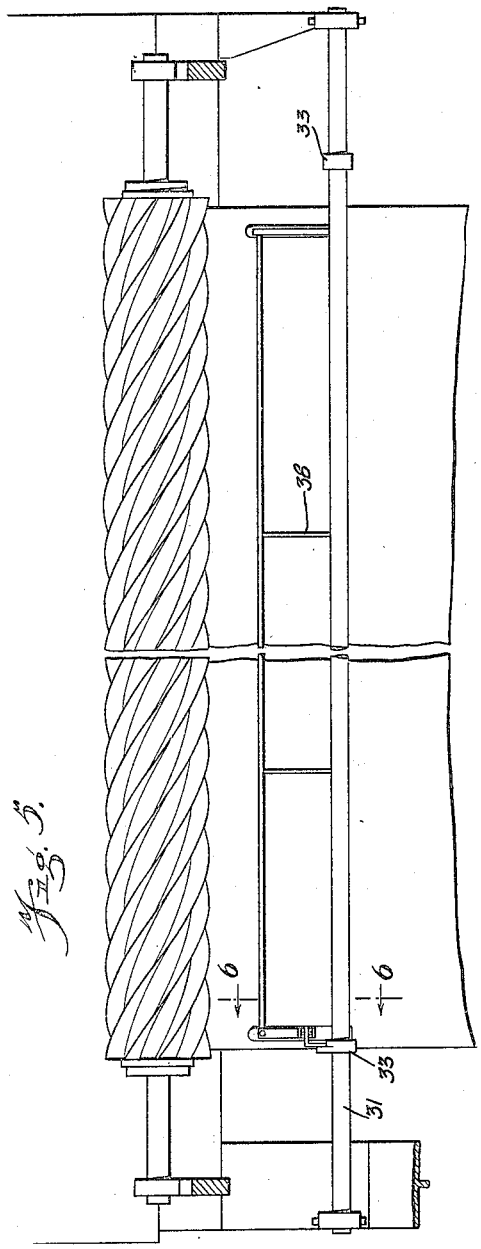
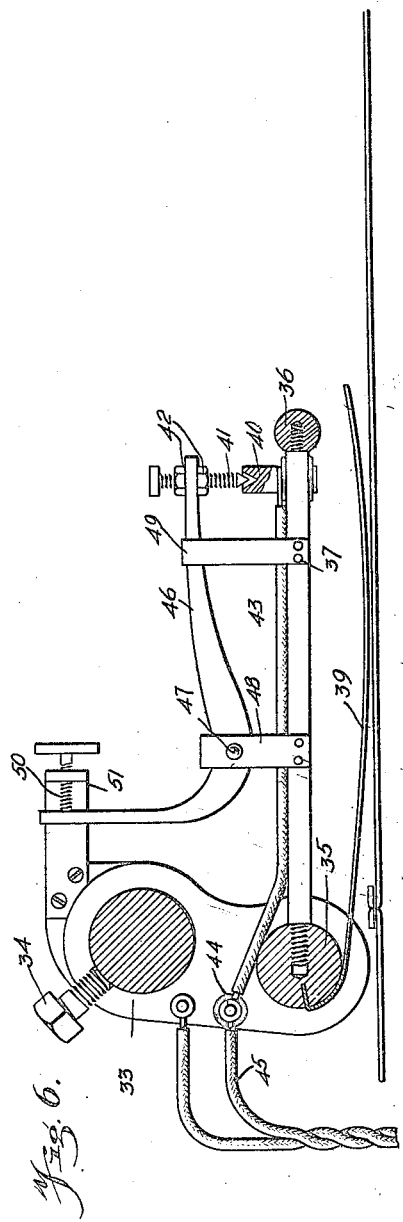
WITNESSES
INVENTOR
MAX POETZSCH
BY
ATTORNEYS Patented Mar. 20, 1923.

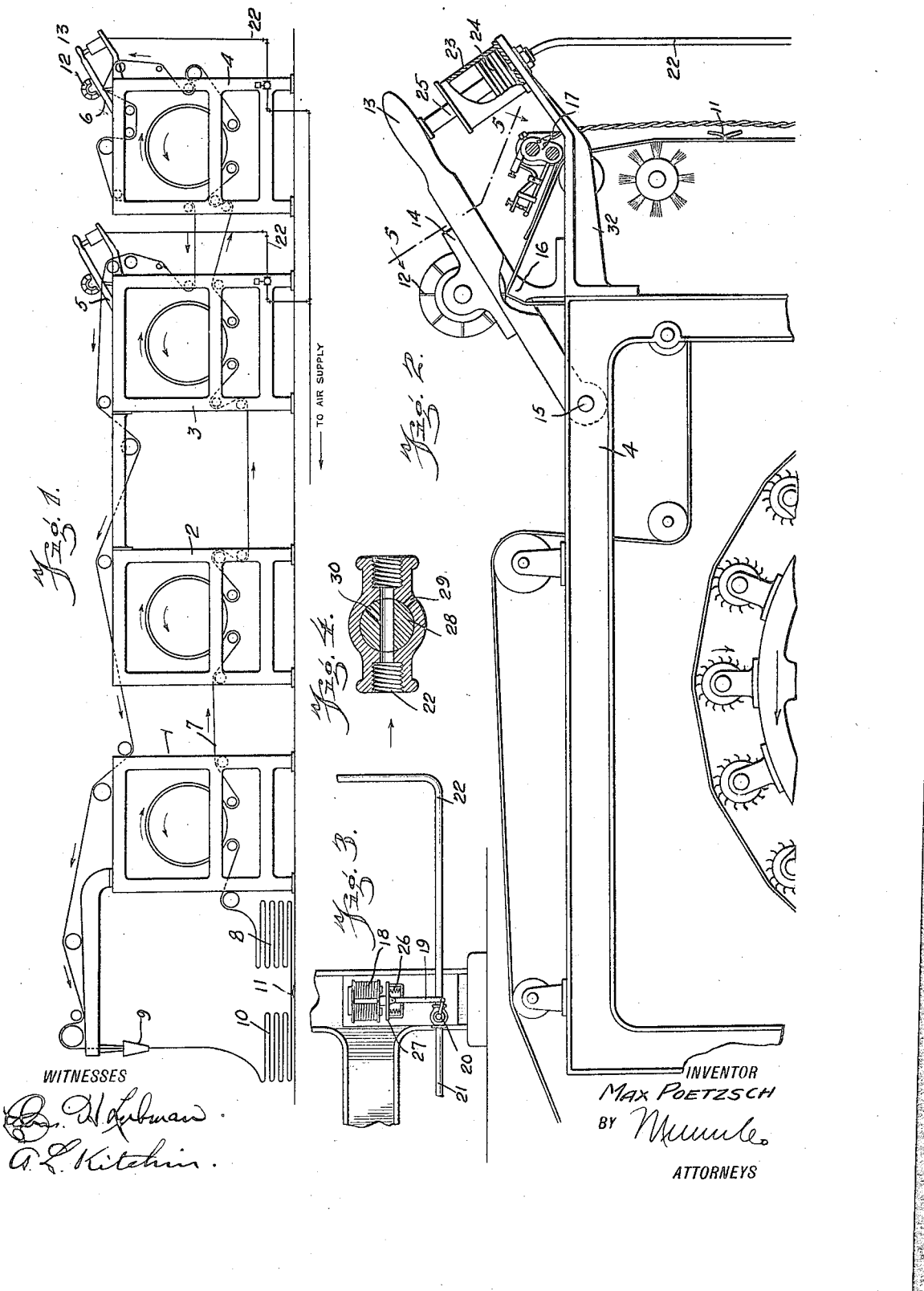

1,449,293

UNITED STATES PATENT OFFICE.

MAX POETZSCH, OF RIDGEWOOD, NEW JERSEY.

COMBINED NAPPER AND SHEARING MACHINE.

Application filed June 25, 1921. Serial No. 480,298.

*To all whom it may concern:*

Be it known that I, MAX POETZSCH, a citizen of the United States, and a resident of Ridgewood, in the county of Bergen and State of New Jersey, have invented a new and Improved Combined Napper and Shearing Machine, of which the following is a full, clear, and exact description.

This invention relates to a napping and shearing machine and has for an object to provide an improved construction wherein the handling of cloth is reduced to a minimum while exceptionally good results are secured.

Another object of the invention is to provide a combined napping and shearing machine wherein any desired number of nappers may be used with one or more shearing devices so arranged that there will be a continuous uninterrupted operation of cloth.

A further object of the invention is to provide a machine wherein the napping and shearing is done in a single operation and means are associated with the shearing device whereby it is automatically elevated or moved to in inoperative position when the seam of the cloth passes the cutter.

In the accompanying drawings—

Figure 1 is a side view of a combined napping and shearing machine disclosing one embodiment of the invention.

Figure 2 is an enlarged side view of the upper part of one napping machine with a shearing machine attachment associated therewith.

Figure 3 is an enlarged detail fragmentary side view showing the arrangement of a valve and magnet embodying certain features of the invention.

Figure 4 is an enlarged sectional view through the valve shown in Figure 3.

Figure 5 is a front view of the cutter and associated parts shown in Figure 2.

Figure 6 is an enlarged sectional view through Figure 5 approximately on line 6—6.

In constructing machines for napping, trimming and shearing cloth it has been the custom heretofore to provide one or more machines to perform the napping operation and a separate machine to perform the shearing operation. This necessitated removing the strip of cloth from the napping machine and at some convenient time pass the same through the shearing machine. In the ordinary napping machines now in common use means are provided for raising the nap of cloth but this nap is not raised all at one time but a certain amount is raised when the cloth is passed through the machine the first time and a little more the second time that the cloth is passed through the machine and so on as often as the cloth passes through the machine. Upon each new passage some effort is needed to raise new nap by reason of the previous nap which is in the way.

In the present invention, means have been provided for shearing the first nap so as to shorten the same after passing once through either one or a series of machines so that when the cloth is again passed through the napping machines less effort will be required to raise additional nap and said additional nap will be assured before the cloth has passed a third time through the machine. In this way a thick and properly prepared nap is provided in one continuous operation.

In order to accomplish this result a special construction has been prepared as shown in the accompanying drawings in which 1, 2, 3 and 4 indicate ordinary napping machines as now commonly constructed. As these machines are of common or ordinary construction no detail description thereof will be given. Arranged on the machines 3 and 4 are shearing devices 5 and 6, said shearing devices being of identical construction but preferably two are used in order that a second shearing operation may be provided for the cloth before it again passes through the napping machines and in this way insure a proper length of nap.

As shown in Figure 1 the cloth 7 is moved from a pile 8 through the napping machines and also through the respective shearing machines to a folding device 9 which folds the cloth in a second pile 10. The cloth is secured together at the ends by a suitable line of stitching whereby an enlargement or seam 11 is produced. In ordinary work the cloth 7 must pass through the structure shown in Figure 1 several times and, therefore, is formed into an endless belt structure. The seam 11 acts to properly hold the ends of the cloth together but cannot pass through the shearing machines 5 and 6 when in ordinary operation. Heretofore, the workman would stand by the machine continuously and when the seam 11 approached the shearing roller 12 he would raise said roller by moving upwardly the handle 13 and would hold the roller in an upper or raised position until the seam had passed. Occasionally the operator fails to raise the handle at the proper time and, consequently, the cutter 12 strikes the seam and is broken. To obviate this manual operation for allowing the seam 11 to pass, a special construction has been provided as shown in Figures 2 to 6 inclusive. This construction includes the usual frame 14 on which the cutter 12 is mounted and also the manually actuated handle 13. This handle and frame 14 are both pivoted at 15 on the frame of the napper 4.

As indicated in Figure 2 when the cutter 12 is in operation it is rotating at a high rate of speed a short distance from the upper edge of the rest 16 and thereby cuts the nap to the desired length. In order to raise the knife or cutter 12 to prevent cutting the seam 11, a feeler construction 17 is provided and when the same is operated by the seam 11 a circuit will be closed for energizing the magnet 18, which magnet will pull on the link 19 and open the valve 20 whereupon compressed air from the supply pipe 21 will pass into the pipe 22 and from thence into the bottom of cylinder 23. This will cause the piston 24 to be raised and push upwardly the piston rod 25 which rod acts on lever 13 for raising the same. It will thus be seen that whenever the mechanism 17 is actuated, air is immediately turned on for raising the cutter 12 to an inoperative position. As soon as the seam has passed the circuit of magnet 18 will be broken by the mechanism 17 going back to its former position. When the circuit is broken, springs 26 acting on the armature connected with link 19 will pull said link back to its former position and will close the valve whereupon the bore 28 in the valve will register with the vent 29 and the auxiliary bore 30 will register with the opening pipe 22. This will allow the air to bleed from cylinder 23 to pipe 22 whereupon piston 24 and piston rod 25 will move back to their former position and allow the lever 13 and cutter 12 to again assume their operative position. By the time the seam 11 leaves the feeling mechanism 17 and passes over the rest 16, air will be bled from the cylinder 23 so that the shearing operation is stopped for only a short time.

The feeler mechanism 17 as shown in Figure 2 is provided with a supporting stationary rod 31 secured to the bracket 32 or to any other suitable support whereby it may properly support the fitting 33 which fitting is rigidly secured thereto by any suitable means, as for instance, a set screw 34. A rod 35 is pivotally mounted in the fittings 33 so as to freely rotate therein said rod being connected to a parallel rod 36 by end bars 37 whereby a rigid frame is produced. Stiffening rods 38 may be provided if desired. Adjacent each end of the rod 35 are arranged light and somewhat resilient feeling fingers 39 which are rigidly secured to the rod 35 so that when they are raised by the seam 11, rod 35 will be rocked a short distance and will move the rod 36 and associated parts until a contact socket 40 engages the contact pin 41. The contact socket 40 is secured to one of the bars 37 but insulated therefrom and is provided with a suitable socket for receiving the end of the pin 41, which pin is threaded and locked in any adjusted position by a suitable nut 42. A supply wire 43 is connected with the socket 40 and with an insulated binding post 44, which binding post in turn is connected through wire 45 to a suitable source of current supply. The fitting 33 is grounded so that current passing through wires 45, binding post 44 and wire 43 will pass through the socket member 40 to pin 41 and from thence to a rockable adjusting arm 46 and finally to the grounded fitting 33. Arm 46 is pivotally mounted at 47 on a suitable bracket 48 secured to the bar 37, said arm being guided in its back and forth movement by suitable guiding fingers 49. As the seam 11 will raise the fingers 39, bar 36 and associated parts only a short distance, it is necessary to adjust the pin 41 a proper distance from the socket member 40. This may be done by adjusting the nuts 42 or may be done by adjusting a suitable set screw 50 mounted on a bracket 51 secured to the fitting 33. This arrangement permits the bar 37, bar 36 and associated parts to swing comparatively a great distance if desired as the arm 46 will swing away from the pin 41 if necessary. Preferably, the pin 41 is arranged as near the socket member 40 as possible without producing a spark so that a very slight movement of the fingers 39 will close the circuit and thereby insure the raising of the cutter to permit the seam to pass. In any cloth the same is comparatively small but in very fine cloth only a small movement is produced and, consequently, this fine adjustment is desirable. Preferably, the fingers 39 do not touch the cloth but are arranged very near the same and are quickly and easily lifted by the seam 11 when the same passes.

In operation, a certain length of cloth is threaded through the machine as shown in Figure 1 and the ends sewed together which will naturally produce a seam. This seam 11 operates the feeling fingers 39 and usually the operator carefully watches the operation for the first time the seam passes in order to be sure that the device operates properly. After adjusting the contacts 40 and 41 and seeing that the seam properly actuates the device, it is allowed to operate continuously until the proper nap has been secured. This is usually done by passing the strip of cloth through the series of nappers shown in Figure 1, from two to six times. However, when the operator decides the nap is in proper condition he will cut the seam 11 at a convenient time after it passes through the folding devices 9 so that the pile 10 will be folded in the usual manner while the pile 8 will be fed in the machine and gradually the entire strip of cloth will be arranged on pile 10 from which it may be moved to any desired point and the machine stopped or a new strip placed in the machine. This new strip may be placed in the machine by connecting it with the end of the old strip of cloth without stopping the machine or the machine may be stopped and a new strip threaded through in the usual manner.

What I claim is:—

1. In a shearing machine of the character described, a rest over which a strip of cloth is adapted to pass said strip of cloth having a seam, a cutter for shearing the nap as it passes over said rest, movable means for supporting said cutter, a pneumatically actuated member for shifting said movable means so that the cutter may be moved out of operative relation with said rest, means providing a source of air supply for said pneumatic means, a valve for controlling the air admitted to said pneumatic means, an electrically operated motor for opening said valve, means for automatically closing said valve when part of the motor has been turned off, and means for supplying current to said motor, said means including a pair of contacts and a feeler finger for moving said contacts into engagement, said feeler fingers being positioned to be swung a predetermined ditsance by said seam as the same approaches said rest.

2. In a shearing machine of the character described, a rest over which a strip of cloth is adapted to pass, said strip of cloth having a seam, a cutter for shearing the nap of said cloth, a movable frame for supporting said cutter, a piston rod engaging said frame for shifting the same so that the cutter will be out of operative relation with the rest, a piston connected with said piston rod, a cylinder in which said piston is located, means for supplying compressed air to said cylinder, said means including a valve, an electrically operated member for opening said valve, automatically actuated means for closing said valve after the operation by said electrically operated means, and a feeler mechanism for closing the circuit of said electrically operated means, said feeler mechanism including a pair of contacts and a feeler member actuated by said seam for closing said contacts.

3. In a shearing machine of the class described, a pivotally mounted arm carrying a shearing cutter, a rest below said cutter, a standard mounted adjacent said rest mounting a pneumatic mechanism adapted to swing said arm for increasing the space between said rest and said shearing tool and an electrically operated device also mounted on said standard for actuating said pneumatic mechanism when a projecting object is about to pass between the shearing cutter and the rest.

4. In a shearing machine of the class described, an arm pivoted at one end to the frame of the shearing machine, a cutting tool on said arm intermediate its ends, a rest below said tool, a standard secured to said frame and extending outwardly, pneumatic means mounted on said standard immediately below the free end of said arm, and electric means on said standard actuated by a projecting object about to reach said rest for opening a valve permitting fluid to enter said pneumatic means to actuate the same, and thereby swing said arm to raise said cutter a material distance above the rest.

MAX POETZSCH.